(12) United States Patent
Nazar et al.

(10) Patent No.: US 11,469,986 B2
(45) Date of Patent: Oct. 11, 2022

(54) CONTROLLED MICRO FAULT INJECTION ON A DISTRIBUTED APPLIANCE

(71) Applicant: Cisco Technology, Inc., San Jose, CA (US)

(72) Inventors: Shadab Nazar, Fremont, CA (US); Pavan Mamillapalli, San Ramon, CA (US); Chetan Narsude, Sunnyvale, CA (US); Gaurav Gupta, Santa Clara, CA (US); Azeem Suleman, San Jose, CA (US); Sravya Boggavarapu, Dublin, CA (US); Jose Delgado, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 216 days.

(21) Appl. No.: 15/713,319

(22) Filed: Sep. 22, 2017

(65) Prior Publication Data

US 2018/0367435 A1 Dec. 20, 2018

Related U.S. Application Data

(60) Provisional application No. 62/521,023, filed on Jun. 16, 2017.

(51) Int. Cl.
*H04L 43/50* (2022.01)
*H04L 41/0893* (2022.01)
(Continued)

(52) U.S. Cl.
CPC .......... *H04L 43/50* (2013.01); *H04L 41/0893* (2013.01); *H04L 41/145* (2013.01); *H04L 41/147* (2013.01)

(58) Field of Classification Search
CPC .... H04L 43/50; H04L 41/0893; H04L 41/145
(Continued)

(56) References Cited

U.S. PATENT DOCUMENTS

| 5,204,829 A | 4/1993 | Lyu et al. |
| 6,763,380 B1 | 7/2004 | Mayton et al. |

(Continued)

FOREIGN PATENT DOCUMENTS

| CN | 105471830 | 4/2016 |
| CN | 105721193 | 6/2016 |

(Continued)

OTHER PUBLICATIONS

Liu et al., "A Real-Time Network Simulation Infrastructure Based on Open VPN," Journal of Systems and Software, Aug. 4, 2008, pp. 1-45.

(Continued)

*Primary Examiner* — Anh Nguyen
*Assistant Examiner* — Tony Williams
(74) *Attorney, Agent, or Firm* — Polsinelli

(57) ABSTRACT

Aspects of the technology provide methods for simulating a failure in a tenant network. In some aspects, a monitoring appliance of the disclosed technology can be configured to carry out operations for receiving packets at a virtual device in the monitoring appliance, from a corresponding network device in the tenant network, and instantiating a firewall at the virtual device, wherein the firewall is configured to selectively block traffic routed from the network device to the virtual device in the monitoring appliance. The monitoring appliance can simulate failure of the network device by blocking traffic from the network device to the virtual device using the firewall, and analyze the tenant network to determine a predicted impact a failure of the network device (Continued)

would have on the tenant network. Systems and machine-readable media are also provided.

20 Claims, 6 Drawing Sheets

(51) Int. Cl.
  *H04L 41/14* (2022.01)
  *H04L 41/147* (2022.01)
(58) Field of Classification Search
  USPC .......................................................... 709/223
  See application file for complete search history.

(56) References Cited

U.S. PATENT DOCUMENTS

| | | |
|---|---|---|
| 7,003,562 B2 | 2/2006 | Mayer |
| 7,089,369 B2 | 8/2006 | Emberling |
| 7,127,686 B2 | 10/2006 | Dreschler et al. |
| 7,360,064 B1 | 4/2008 | Steiss et al. |
| 7,453,886 B1 | 11/2008 | Allan |
| 7,505,463 B2 | 3/2009 | Schuba et al. |
| 7,548,967 B2 | 6/2009 | Amyot et al. |
| 7,552,201 B2 | 6/2009 | Areddu et al. |
| 7,609,647 B2 | 10/2009 | Turk et al. |
| 7,619,989 B2 | 11/2009 | Guingo et al. |
| 7,698,561 B2 | 4/2010 | Nagendra et al. |
| 7,743,274 B2 | 6/2010 | Langford et al. |
| 7,765,093 B2 | 7/2010 | Li et al. |
| 8,010,952 B2 | 8/2011 | Datla et al. |
| 8,073,935 B2 | 12/2011 | Viswanath |
| 8,103,480 B2 | 1/2012 | Korn et al. |
| 8,190,719 B2 | 5/2012 | Furukawa |
| 8,209,738 B2 | 6/2012 | Nicol et al. |
| 8,261,339 B2 | 9/2012 | Aldridge et al. |
| 8,312,261 B2 | 11/2012 | Rao et al. |
| 8,375,117 B2 | 2/2013 | Venable, Sr. |
| 8,441,941 B2 | 5/2013 | McDade et al. |
| 8,479,267 B2 | 7/2013 | Donley et al. |
| 8,484,693 B2 | 7/2013 | Cox et al. |
| 8,494,977 B1 | 7/2013 | Yehuda et al. |
| 8,554,883 B2 | 10/2013 | Sankaran |
| 8,589,934 B2 | 11/2013 | Makljenovic et al. |
| 8,621,284 B2 | 12/2013 | Kato |
| 8,627,328 B2 | 1/2014 | Mousseau et al. |
| 8,693,344 B1 | 4/2014 | Adams et al. |
| 8,693,374 B1 | 4/2014 | Murphy et al. |
| 8,761,036 B2 | 6/2014 | Fulton et al. |
| 8,782,182 B2 | 7/2014 | Chaturvedi et al. |
| 8,824,482 B2 | 9/2014 | Kajekar et al. |
| 8,910,143 B2 | 12/2014 | Cohen et al. |
| 8,914,843 B2 | 12/2014 | Bryan et al. |
| 8,924,798 B2 | 12/2014 | Jerde et al. |
| 9,019,840 B2 | 4/2015 | Salam et al. |
| 9,038,151 B1 | 5/2015 | Chua et al. |
| 9,055,000 B1 | 6/2015 | Ghosh et al. |
| 9,106,555 B2 | 8/2015 | Agarwal et al. |
| 9,137,096 B1 | 9/2015 | Yehuda et al. |
| 9,225,601 B2 | 12/2015 | Khurshid et al. |
| 9,246,818 B2 | 1/2016 | Deshpande et al. |
| 9,264,922 B2 | 2/2016 | Gillot et al. |
| 9,276,877 B1 | 3/2016 | Chua et al. |
| 9,319,300 B2 | 4/2016 | Huynh Van et al. |
| 9,344,348 B2 | 5/2016 | Ivanov et al. |
| 9,369,434 B2 | 6/2016 | Kim et al. |
| 9,389,993 B1 | 7/2016 | Okmyanskiy et al. |
| 9,405,553 B2 | 8/2016 | Branson et al. |
| 9,444,842 B2 | 9/2016 | Porras et al. |
| 9,497,207 B2 | 11/2016 | Dhawan et al. |
| 9,497,215 B2 | 11/2016 | Vasseur et al. |
| 9,544,224 B2 | 1/2017 | Chu et al. |
| 9,548,965 B2 | 1/2017 | Wang et al. |
| 9,553,845 B1 | 1/2017 | Talmor et al. |
| 9,571,502 B2 | 2/2017 | Basso et al. |
| 9,571,523 B2 | 2/2017 | Porras et al. |
| 9,594,640 B1 | 3/2017 | Chheda |
| 9,596,141 B2 | 3/2017 | McDowall |
| 9,641,249 B2 | 5/2017 | Kaneriya et al. |
| 9,654,300 B2 | 5/2017 | Pani |
| 9,654,361 B2 | 5/2017 | Vasseur et al. |
| 9,654,409 B2 | 5/2017 | Yadav et al. |
| 9,660,886 B1 | 5/2017 | Ye et al. |
| 9,660,897 B1 | 5/2017 | Gredler |
| 9,667,645 B1 | 5/2017 | Belani et al. |
| 9,680,875 B2 | 6/2017 | Knjazihhin et al. |
| 9,686,180 B2 | 6/2017 | Chu et al. |
| 9,686,296 B1 | 6/2017 | Murchison et al. |
| 9,690,644 B2 | 6/2017 | Anderson et al. |
| 9,781,004 B2 | 10/2017 | Danait et al. |
| 9,787,559 B1 | 10/2017 | Schroeder |
| 9,998,247 B1 | 6/2018 | Choudhury et al. |
| 10,084,795 B2 | 9/2018 | Akireddy et al. |
| 10,084,833 B2 | 9/2018 | McDonnell et al. |
| 10,084,895 B2 | 9/2018 | Kasat et al. |
| 2002/0143855 A1 | 10/2002 | Traversat et al. |
| 2002/0178246 A1 | 11/2002 | Mayer |
| 2003/0229693 A1 | 12/2003 | Mahlik et al. |
| 2004/0073647 A1 | 4/2004 | Gentile et al. |
| 2004/0088586 A1* | 5/2004 | Wesinger, Jr. .... H04L 29/12783 726/12 |
| 2004/0168100 A1 | 8/2004 | Thottan et al. |
| 2005/0108389 A1 | 5/2005 | Kempin et al. |
| 2007/0011629 A1 | 1/2007 | Shacham et al. |
| 2007/0124437 A1 | 5/2007 | Chervets |
| 2007/0214244 A1 | 9/2007 | Hitokoto et al. |
| 2008/0031147 A1 | 2/2008 | Fieremans et al. |
| 2008/0117827 A1 | 5/2008 | Matsumoto et al. |
| 2008/0133731 A1 | 6/2008 | Bradley et al. |
| 2008/0172716 A1 | 7/2008 | Talpade et al. |
| 2009/0240758 A1 | 9/2009 | Pasko et al. |
| 2009/0249284 A1 | 10/2009 | Antosz et al. |
| 2010/0191612 A1 | 7/2010 | Raleigh |
| 2010/0198909 A1 | 8/2010 | Kosbab et al. |
| 2011/0093612 A1 | 4/2011 | Murakami |
| 2011/0295983 A1 | 12/2011 | Medved et al. |
| 2011/0307886 A1* | 12/2011 | Thanga ................. G06F 9/5077 718/1 |
| 2012/0054163 A1 | 3/2012 | Liu et al. |
| 2012/0198073 A1 | 8/2012 | Srikanth et al. |
| 2012/0297061 A1 | 11/2012 | Pedigo et al. |
| 2013/0097660 A1 | 4/2013 | Das et al. |
| 2013/0191516 A1 | 7/2013 | Sears |
| 2014/0019597 A1 | 1/2014 | Nath et al. |
| 2014/0177638 A1 | 6/2014 | Bragg et al. |
| 2014/0222996 A1 | 8/2014 | Vasseur et al. |
| 2014/0304831 A1 | 10/2014 | Hidlreth et al. |
| 2014/0307556 A1 | 10/2014 | Zhang |
| 2014/0321277 A1 | 10/2014 | Lynn, Jr. et al. |
| 2014/0337500 A1* | 11/2014 | Lee ........................ H04L 41/12 709/223 |
| 2014/0379915 A1 | 12/2014 | Yang et al. |
| 2015/0019756 A1 | 1/2015 | Masuda |
| 2015/0113143 A1 | 4/2015 | Stuart et al. |
| 2015/0124826 A1 | 5/2015 | Edsall et al. |
| 2015/0135012 A1* | 5/2015 | Bhalla ................. H04L 41/0631 714/26 |
| 2015/0172104 A1* | 6/2015 | Brandwine ............. H04L 69/40 709/224 |
| 2015/0186206 A1 | 7/2015 | Bhattacharya et al. |
| 2015/0188808 A1* | 7/2015 | Ghanwani ........... H04L 41/0663 709/244 |
| 2015/0234695 A1 | 8/2015 | Cuthbert et al. |
| 2015/0244617 A1 | 8/2015 | Nakil et al. |
| 2015/0271104 A1 | 9/2015 | Chikkamath et al. |
| 2015/0295771 A1 | 10/2015 | Cuni et al. |
| 2015/0365314 A1 | 12/2015 | Hiscock et al. |
| 2015/0381484 A1 | 12/2015 | Hira et al. |
| 2016/0020993 A1 | 1/2016 | Wu et al. |
| 2016/0021141 A1 | 1/2016 | Liu et al. |
| 2016/0026631 A1 | 1/2016 | Salam et al. |
| 2016/0036636 A1 | 2/2016 | Erickson et al. |
| 2016/0048420 A1 | 2/2016 | Gourlay et al. |
| 2016/0078220 A1 | 3/2016 | Scharf et al. |

(56) References Cited

U.S. PATENT DOCUMENTS

| | | | |
|---|---|---|---|
| 2016/0080350 | A1 | 3/2016 | Chaturvedi et al. |
| 2016/0080502 | A1* | 3/2016 | Yadav ................... G06F 16/285 709/227 |
| 2016/0099883 | A1 | 4/2016 | Volt et al. |
| 2016/0105317 | A1 | 4/2016 | Zimmermann et al. |
| 2016/0112246 | A1 | 4/2016 | Singh et al. |
| 2016/0112269 | A1 | 4/2016 | Singh et al. |
| 2016/0149751 | A1 | 5/2016 | Pani et al. |
| 2016/0164748 | A1 | 6/2016 | Kim |
| 2016/0224277 | A1 | 8/2016 | Batra et al. |
| 2016/0241436 | A1 | 8/2016 | Fourie et al. |
| 2016/0254964 | A1 | 9/2016 | Benc |
| 2016/0255051 | A1* | 9/2016 | Williams ............ H04L 63/0236 726/1 |
| 2016/0267384 | A1 | 9/2016 | Salam et al. |
| 2016/0323319 | A1 | 11/2016 | Gourlay et al. |
| 2016/0330076 | A1 | 11/2016 | Tiwari et al. |
| 2016/0352566 | A1 | 12/2016 | Mekkattuparamban et al. |
| 2016/0359697 | A1* | 12/2016 | Scheib ................... G06F 16/162 |
| 2016/0359912 | A1* | 12/2016 | Gupta ................. G06F 16/1748 |
| 2016/0380892 | A1 | 12/2016 | Mahadevan et al. |
| 2017/0026292 | A1 | 1/2017 | Smith et al. |
| 2017/0031800 | A1 | 2/2017 | Shani et al. |
| 2017/0031970 | A1 | 2/2017 | Burk |
| 2017/0048110 | A1 | 2/2017 | Wu et al. |
| 2017/0048126 | A1 | 2/2017 | Handige Shankar et al. |
| 2017/0054758 | A1 | 2/2017 | Maino et al. |
| 2017/0063599 | A1 | 3/2017 | Wu et al. |
| 2017/0093630 | A1 | 3/2017 | Foulkes |
| 2017/0093664 | A1 | 3/2017 | Lynam et al. |
| 2017/0093750 | A1 | 3/2017 | McBride et al. |
| 2017/0093918 | A1 | 3/2017 | Banerjee et al. |
| 2017/0111259 | A1 | 4/2017 | Wen et al. |
| 2017/0118167 | A1 | 4/2017 | Subramanya et al. |
| 2017/0126740 | A1 | 5/2017 | Bejarano Ardila et al. |
| 2017/0126792 | A1 | 5/2017 | Halpern et al. |
| 2017/0134233 | A1 | 5/2017 | Dong et al. |
| 2017/0163442 | A1 | 6/2017 | Shen et al. |
| 2017/0187577 | A1 | 6/2017 | Nevrekar et al. |
| 2017/0195187 | A1 | 7/2017 | Bennett et al. |
| 2017/0206129 | A1 | 7/2017 | Yankilevich et al. |
| 2017/0222873 | A1 | 8/2017 | Lee et al. |
| 2017/0353355 | A1 | 12/2017 | Danait et al. |
| 2018/0069754 | A1 | 3/2018 | Dasu et al. |
| 2018/0167294 | A1 | 6/2018 | Gupta et al. |

FOREIGN PATENT DOCUMENTS

| | | |
|---|---|---|
| CN | 105721297 | 6/2016 |
| CN | 106130766 | 11/2016 |
| CN | 106603264 | 4/2017 |
| CN | 103701926 | 6/2017 |
| WO | WO 2015/014177 | 2/2015 |
| WO | WO 2015/187337 | 12/2015 |
| WO | WO 2016/011888 | 1/2016 |
| WO | WO 2016/039730 | 3/2016 |
| WO | WO 2016/072996 | 5/2016 |
| WO | WO 2016/085516 | 6/2016 |
| WO | WO 2016/093861 | 6/2016 |
| WO | WO 2016/119436 | 8/2016 |
| WO | WO 2016/130108 | 8/2016 |
| WO | WO 2016/161127 | 10/2016 |
| WO | WO 2017/031922 | 3/2017 |
| WO | WO 2017/039606 | 3/2017 |
| WO | WO 2017/105452 | 6/2017 |

OTHER PUBLICATIONS

Author Unknown, "Aids to Pro-active Management of Distributed Resources through Dynamic Fault-Localization and Availability Prognosis," FaultLocalization—TR01—CADlab, May 2006, pp. 1-9.

Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.

Cisco, "Verify Contracts and Rules in the ACI Fabric," Cisco, Updated Aug. 19, 16, Document ID: 119023, pp. 1-20.

De Silva et al., "Network-wide Security Analysis," Semantic Scholar, Oct. 25, 2011, pp. 1-11.

Fayaz, Seyed K., et al., "Efficient Network Reachability Analysis using a Succinct Control Plane Representation," 2016, ratul.org, pp. 1-16.

Feldmann, Anja, et al., "IP Network Configuration for Intradomain Traffic Engineering," Semantic Scholar, accessed on Jul. 20, 2017, pp. 1-27.

Han, Yoonseon, et al., "An Intent-based Network Virtualization Platform for SDN," 2016 I FIP, pp. 1-6.

Han, Wonkyu, et al., "LPM: Layered Policy Management for Software-Defined Networks," Mar. 8, 2016, pp. 1-8.

Kazemian, Peyman, et al., "Real Time Network Policy Checking using Header Space Analysis," USENIX Association, 10th USENIX Symposium on Networked Systems Design and Implementation (NSDI '13) pp. 99-111.

Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.

Le, Franck, et al., "Minerals: Using Data Mining to Detect Router Misconfigurations," CyLab, Carnegie Mellon University, CMU—CyLab—06-008, May 23, 2006, pp. 1-14.

Liang, Chieh-Jan Mike, et al., "SIFT: Building an Internet of Safe Things," Microsoft, IPSN' 15, Apr. 14-16, 2015, Seattle, WA, ACM 978, pp. 1-12.

Lopes, Nuno P., et al., "Automatically verifying reachability and well-formedness in P4 Networks," Microsoft, accessed on Jul. 18, 2017, pp. 1-13.

Mai, Haohui, et al., "Debugging the Data Plane with Anteater," SIGCOMM11, Aug. 15-19, 2011, pp. 1-12.

Miller, Nancy, et al., "Collecting Network Status Information for Network-Aware Applications," INFOCOM 2000, pp. 1-10.

Miranda, Joao Sales Henriques, "Fault Isolation in Software Defined Networks," www.qsd.inescid.pt, pp. 1-10.

Moon, Daekyeong, et al., "Bridging the Software/Hardware Forwarding Divide," Berkeley.edu, Dec. 18, 2010, pp. 1-15.

Shin, Seugwon, et al., "FRESCO: Modular Composable Security Services for Software-Defined Networks," To appear in the ISOC Network and Distributed System Security Symposium, Feb. 2013, pp. 1-16.

Shukla, Apoorv, et al., "Towards meticulous data plane monitoring," kaust.edu.sa, access on Aug. 1, 2017, pp. 1-2.

Tang, Yongning, et al., "Automatic belief network modeling via policy inference for SDN fault localization," Journal of Internet Services and Applications, 2016, pp. 1-13.

Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.

Tongaonkar, Alok, et al., "Inferring Higher Level Policies from Firewall Rules," Proceedings of the 21st Large Installation System Administration Conference (LISA '07), Nov. 11-16, 2007, pp. 1-14.

Zhou, Shijie, et al., "High-Performance Packet Classification on GPU," 2014 IEEE, pp. 1-6.

Cisco Systems, Inc., "The Cisco Application Policy Infrastructure Controller Introduction: What is the Cisco Application Policy Infrastructure Controller?" Jul. 31, 2014, 19 pages.

Jain, Praveen, et al., "In-Line Distributed and Stateful Security Policies for Applications in a Network Environment," Cisco Systems, Inc., Aug. 16, 2016, 13 pages.

Maldonado-Lopez, Ferney, et al., "Detection and prevention of firewall—rule conflicts on software-defined networking," 2015 7th International Workshop on Reliable Networks Design and Modeling (RNDM), IEEE, Oct. 5, 2015, pp. 259-265.

(56) References Cited

OTHER PUBLICATIONS

Vega, Andres, et al., "Troubleshooting Cisco Application Centric Infrastructure: Analytical problem solving applied to the Policy Driven Data Center," Feb. 15, 2016, 84 pages.

Xia, Wenfeng, et al., "A Survey on Software-Defined Networking," IEEE Communications Surveys and Tutorials, Mar. 16, 2015, pp. 27-51.

Akella, Aditya, et al., "A Highly Available Software Defined Fabric," HotNets—XIII, Oct. 27-28, 2014, Los Angeles, CA, USA, Copyright 2014, ACM, pp. 1-7.

Alsheikh, Mohammad Abu, et al., "Machine Learning in Wireless Sensor Networks: Algorithms, Strategies, and Application," Mar. 19, 2015, pp. 1-23.

Cisco Systems, Inc., "Cisco Application Centric Infrastructure 9ACI Endpoint Groups (EPG) Usange and Design," White Paper, May 2014, pp. 1-14.

Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.

Lindem, A., et al., "Network Device YANG Organizational Model draft-rtgyangdt-rtgwg-device-model-01," Network Working Group, Internet-draft, Sep. 21, 2015, pp. 1-33.

Panda, Aurojit, et al., "SCL: Simplifying Distributed SDN Control Planes," people.eecs.berkeley.edu, Mar. 2017, pp. 1-17.

Yu et al., "A Flexible Framework for Wireless-Based Intelligent Sensor with Reconfigurability, Dynamic adding, and Web interface," Conference Paper, Jul. 24, 2006, IEEE 2006, pp. 1-7.

* cited by examiner

CONTROLLED MICRO FAULT INJECTION ON A DISTRIBUTED APPLIANCE

CROSS-REFERENCE TO RELATED APPLICATIONS

This application claims the benefit of U.S. Application No. 62/521,023, filed Jun. 16, 2017, entitled "CONTROLLED MICRO-FAULT INJECTION AND REMOVAL ON A DISTRIBUTED APPLIANCE", which is incorporated by reference in its entirety.

BACKGROUND

1. Technical Field

The present technology pertains to network configuration and troubleshooting, and more specifically to systems and methods for fault testing a tenant network using a monitoring appliance configured to simulate network failure events.

2. Introduction

Network configurations for large data center networks are often specified at a centralized controller. The controller can realize the intent in the network by programming switches and routers in the data center according to the specified network configurations. Network configurations are inherently very complex, and involve low level as well as high level configurations of several layers of the network such as access policies, forwarding policies, routing policies, security policies, QoS policies, etc. Given such complexity, the network configuration process is error prone.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
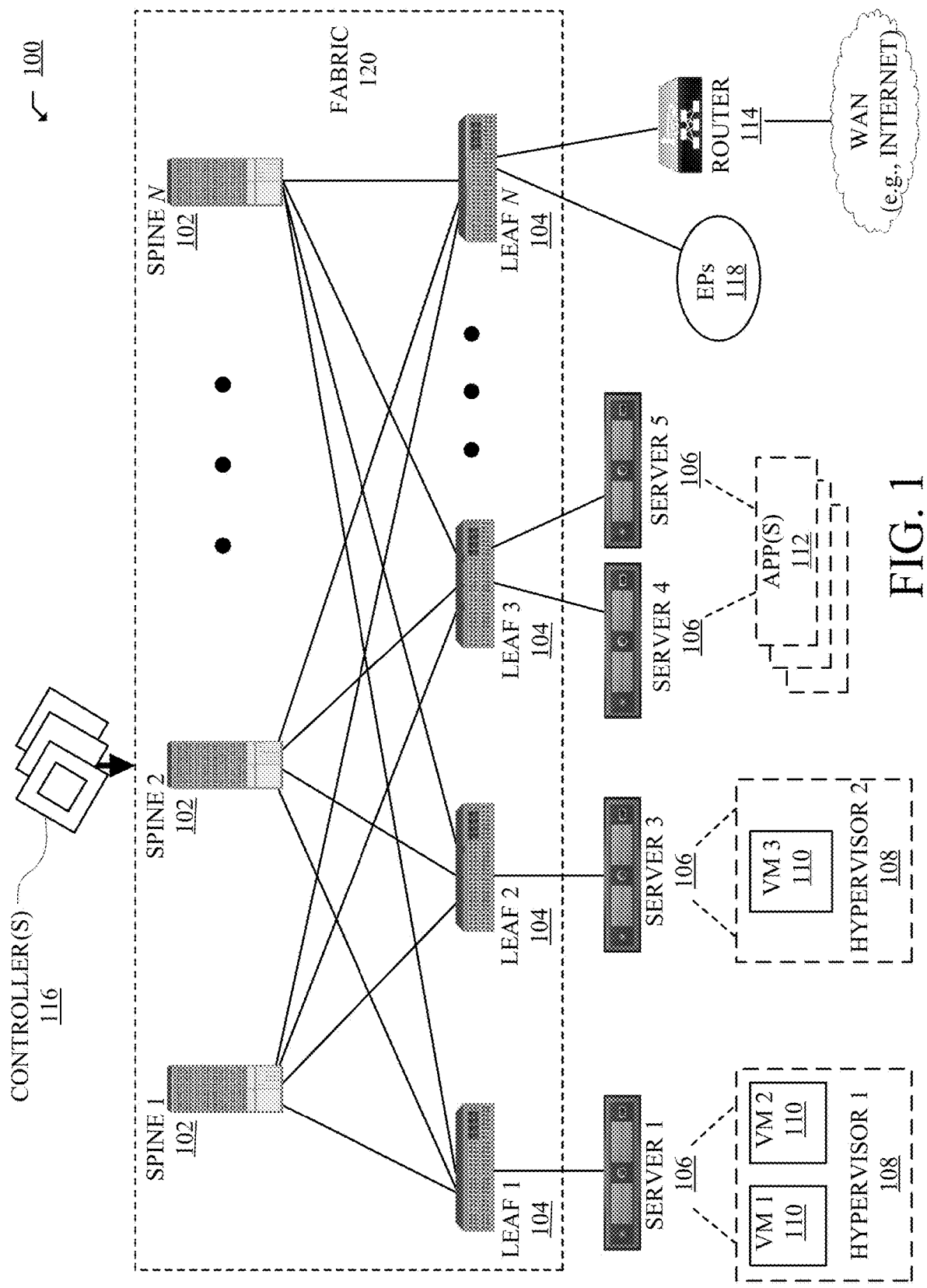
FIG. 1 illustrates an example network environment in which some aspects of the technology can be implemented.

The detailed description set forth below is intended as a description of various configurations of the disclosed technology and is not intended to represent the only configurations in which the technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview:

In some computer network implementations, one or more network systems (e.g., "network appliances" or "appliances") can be configured to be connected to and monitor the network fabric. Such deployments can be used to help troubleshoot customer (e.g. tenant) networking issues, to ensure conformity with agreed-upon networking policies such as service level agreements (SLAs), and to ensure an overall high quality of tenant experience.

In many network appliance deployments it may be desirable to test various portions of the network fabric and/or the monitoring appliance in order to proactively diagnose potential network issues. In conventional deployments, a network administrator may test the robustness of a particular network configuration by interrupting various services (e.g., virtual machines, containers, or network operators), and systems (e.g., servers, routers, and switches, etc.). However, the interruption of certain systems and services can be disruptive to active network users.

Description:

Aspects of the disclosed technology address the foregoing problems by providing a way to simulate specific network failure events, without the need for killing network components or suspending services in the tenant network. As such, implementations of the technology facilitate the convenient ability to "stress test" different portions of a network fabric, without degrading services to active users.

In some implementations, firewalls can be paired with one or more virtual machines (VMs) and/or network containers in the monitoring appliance. Using the firewalls, a network administrator can block specific ports/services to simulate the interruption of device or service availability in the network fabric (e.g., spine or leaf switches) Similarly, firewall configurations can be used to simulate the interruption of communication between operators, databases, and/or other VM's that are part of the network appliance.

The disclosure now turns to FIG. 1, which illustrates a diagram of an example network environment 100, such as a data center. Network 100 can include a Fabric 120 which can represent the physical layer or infrastructure (e.g., underlay) of the network 100. Fabric 120 can include Spines 102 (e.g., spine routers or switches) and Leafs 104 (e.g., leaf routers or switches) which can be interconnected for routing traffic in the Fabric 120. The Spines 102 can interconnect the Leafs 104 in the Fabric 120, and the Leafs 104 can connect the Fabric 120 to the overlay portion of the network 100, which can include application services, servers, virtual machines, containers, endpoints, etc. Thus, network connectivity in the Fabric 120 can flow from Spines 102 to Leafs 104, and vice versa. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies. Network policies can be driven by the one or more controllers 116 and/or the Leafs 104. The Leafs 104 can connect Servers 106, Hypervisors 108, Virtual Machines (VMs) 110, Applications 112, Endpoints 118, External Routers 114, etc., with the Fabric 120. For example, Leafs 104 can encapsulate and decapsulate packets to and from Servers 106 in order to enable communications throughout the network 100, including the Fabric 120. Leafs 104 can also provide any other devices, services, tenants, or workloads with access to the Fabric 120.

Applications 112 can include software applications, services, operators, containers, appliances, functions, service chains, etc. For example, Applications 112 can include a firewall, a database, a CDN server, an IDS/IPS, a deep packet inspection service, a message router, a virtual switch, etc. VMs 110 can be virtual machines hosted by Hypervisors 108 running on Servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can each host one or more VMs 110.

In some cases, VMs 110 and/or Hypervisors 108 can be migrated to other Servers 106. Servers 106 can similarly be migrated to other locations in the network environment 100. For example, a server connected to a specific leaf can be changed to connect to a different or additional leaf. Such configuration or deployment changes can involve modifications to settings and policies that are applied to the resources being migrated.

In some cases, one or more Servers 106, Hypervisors 108, and/or VMs 110 can represent a tenant or customer space. Tenant space can include workloads, services, applications, devices, and/or resources that are associated with one or more clients or subscribers. Accordingly, traffic in the network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, and configuration information between tenants can be managed by one or more controllers 116.

Policies, configurations, settings, etc., in the network can be implemented at the application level, the physical level, and/or both. For example, one or more controllers 116 can define a policy model at the application level which defines policies and other settings for groups of applications or services, such as endpoint groups. In some addition, the Leafs 104, as well as other physical devices such as physical servers or Spines 102, can apply specific policies to traffic. For example, Leafs 104 can apply specific policies or contracts to traffic based on tags or characteristics of the traffic, such as protocols associated with the traffic, applications or endpoint groups associated with the traffic, network address information associated with the traffic, etc.

In some examples, network 100 can be configured according to a particular software-defined network (SDN) solution. The network 100 can deploy one or more SDN solutions, such as CISCO ACI or VMWARE NSX solutions. These example SDN solutions are briefly described below.

ACI is an example SDN solution which can be implemented in the network 100. ACI can provide an application policy-based solution through scalable distributed enforcement. ACI supports integration of physical and virtual environments under a declarative policy model for networks, servers, services, security, requirements, etc. For example, the ACI framework implements End Point Groups (EPGs), which can include a collection of endpoints or applications that share common policy requirements, such as security, QoS, services, etc. Endpoints can be virtual/logical or physical devices, such as VMs and bare-metal physical servers that are connected to the network 100. Endpoints can have one or more attributes such as VM name, guest OS name, a security tag, etc. Application policies can be applied between EPGs, instead of endpoints directly, in the form of contracts. The Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, and physical hosts. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more controllers 116, such as an application policy infrastructure controller (APIC). The Leaf 104 can classify to which EPG the traffic from a host belong and enforce policies accordingly.

Another example SDN solution is based on VMWare NSX. With VMWare NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, from our previous example, DFW rules can be configured to block HTTP traffic between web, application, and database security groups.

Network 100 may deploy different hosts via the Leafs 104, Servers 106, Hypervisors 108, VMs 110, Applications 112, Controllers 116, and/or Endpoints 118, such as VMware ESXi hosts, Windows Hyper-V hosts, bare metal physical hosts, etc. The network 100 may interoperate with a wide variety of Hypervisors 108, Servers 106 (e.g., physical and/or virtual servers), SDN orchestration platforms, etc. The network 100 may implement a declarative model to allow its integration with application design and holistic network policy.

One or more controllers 116 can provide centralized access to fabric information, application configuration, resource configuration, application-level policy modeling for a software-defined network (SDN) infrastructure, integration with management systems or servers, etc. The one or more controllers 116 can form a control plane that interfaces with an application plane via northbound APIs and a data plane via southbound APIs. In some examples, the one or more controllers 116 can include SDN controllers or managers, such as an application policy infrastructure controller (APIC) or a vCenter NSX Manager.

As previously noted, controllers 116 can define and manage application-level model(s) for policies in the network 100. In some cases, application or device policies can also be managed and/or defined by other components in the network. For example, a hypervisor or virtual appliance, such as a VM or container, can run a server or management tool to manage software and services in the network 100, including policies and settings for virtual appliances.

Network 100 can include one or more different types of SDN solutions, hosts, etc. For the sake of clarity and explanation purposes, the examples in the following disclosure will be described in the context of an ACI solution implemented in the network 100, and the one or more controllers 116 may be interchangeably referenced as APIC controllers. However, it should be noted that the technologies and concepts herein are not limited to ACI architectures and may be implemented in other architectures and configurations, including other SDN solutions as well as other types of networks which may not deploy an SDN solution.

Further, as referenced herein, the term "hosts" can refer to servers 106 (e.g., physical or logical), Hypervisors 108, VMs 110, containers (e.g., Applications 112), EPs 118, etc., and can run or include any type of server or application solution. Non-limiting examples of "hosts" can include DVS virtual servers, vCenter and NSX Managers, bare metal physical hosts, AVS hosts, Hyper-V hosts, VMs, Docker Containers, Virtual Routers/Switches (e.g., VPP), etc.

Figure 2A:
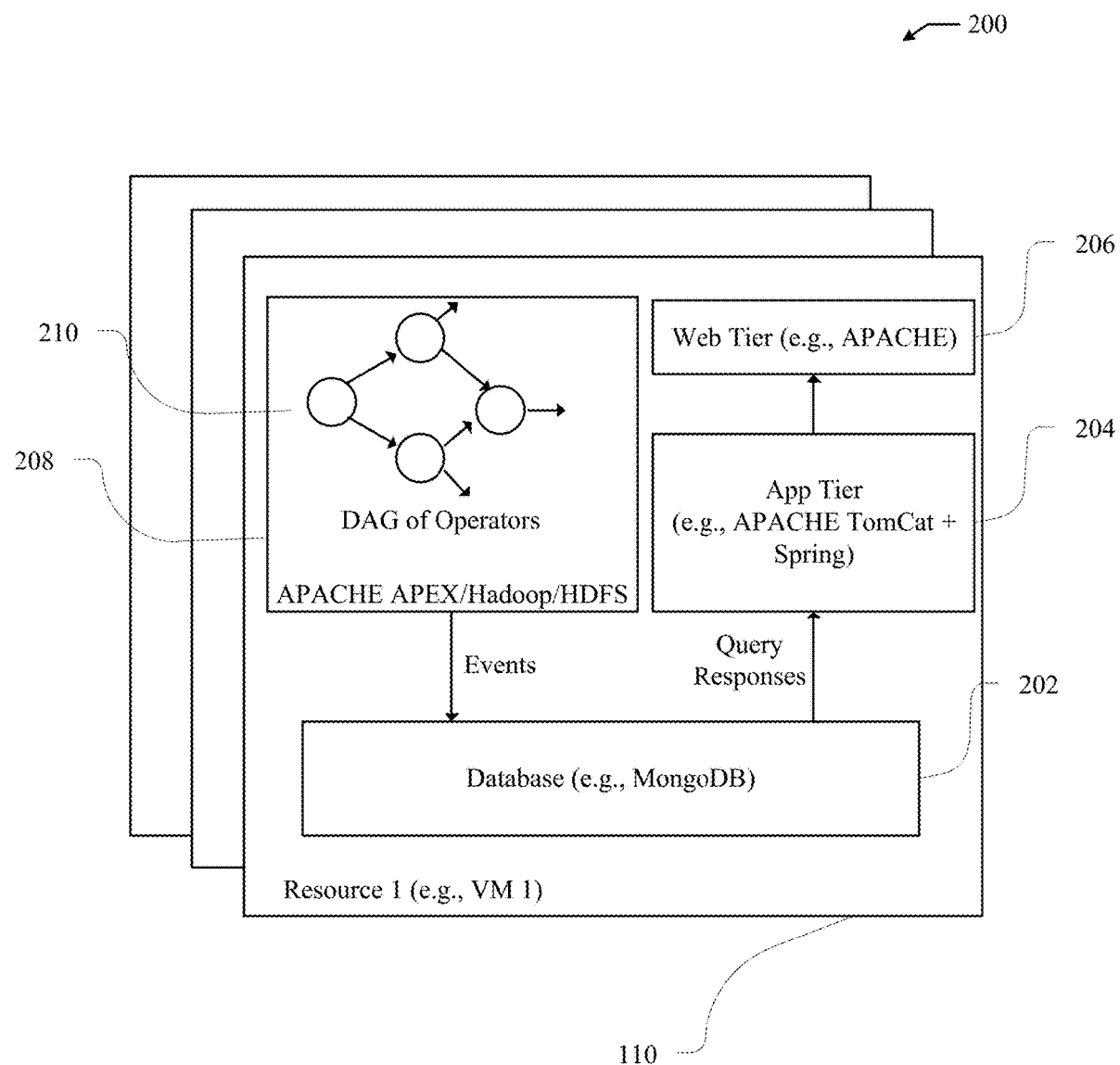
FIG. 2A illustrates an example network assurance appliance, according to some aspects of the technology.

FIG. 2A illustrates a diagram of an example Assurance Appliance 200 for network assurance. In this example, Appliance 200 can include k VMs 110 operating in cluster mode. VMs are used in this example for explanation purposes. However, it should be understood that other configurations are also contemplated herein, such as use of containers, bare metal devices, Endpoints 122, or any other physical or logical systems. Moreover, while FIG. 2A illustrates a cluster mode configuration, other configurations are also contemplated herein, such as a single mode configuration (e.g., single VM, container, or server) or a service chain for example.

Appliance 200 can run on one or more Servers 106, VMs 110, Hypervisors 108, EPs 122, Leafs 104, Controllers 116, or any other system or resource. For example, Assurance Appliance 200 can be a logical service or application running on one or more VMs 110 in Network Environment 100.

Appliance 200 can include Data Framework 208, which can be based on, for example, APACHE APEX and HADOOP. In some cases, assurance checks can be written as individual operators that reside in Data Framework 208. This enables a natively horizontal scale-out architecture that can scale to arbitrary number of switches in Fabric 120 (e.g., ACI fabric).

Appliance 200 can poll Fabric 120 at a configurable periodicity (e.g., an epoch). The analysis workflow can be setup as a DAG (Directed Acyclic Graph) of Operators 210, where data flows from one operator to another and eventually results are generated and persisted to Database 202 for each interval (e.g., each epoch).

The north-tier implements API Server (e.g., APACHE Tomcat and Spring framework) 204 and Web Server 206. A graphical user interface (GUI) interacts via the APIs exposed to the customer. These APIs can also be used by the customer to collect data from Assurance Appliance 200 for further integration into other tools.

Operators 210 in Data Framework 208 (e.g., APEX/Hadoop) can together support assurance operations. Below are non-limiting examples of assurance operations that can be performed by Assurance Appliance 200 via Operators 210.

Security Policy Adherence:

Assurance Appliance 200 can check to make sure the configurations or specification from L_Model 270A, which may reflect the user's intent for the network, including for example the security policies and customer-configured contracts, are correctly implemented and/or rendered in Li_Model 272, Ci_Model 274, and Hi_Model 276, and thus properly implemented and rendered by the fabric members (e.g., Leafs 104), and report any errors, contract violations, or irregularities found.

Static Policy Analysis:

Assurance Appliance 200 can check for issues in the specification of the user's intent or intents (e.g., identify contradictory or conflicting policies in L_Model 270A).

TCAM Utilization:

TCAM is a scarce resource in the fabric (e.g., Fabric 120). However, Assurance Appliance 200 can analyze the TCAM utilization by the network data (e.g., Longest Prefix Match (LPM) tables, routing tables, VLAN tables, BGP updates, etc.), Contracts, Logical Groups 118 (e.g., EPGs), Tenants, Spines 102, Leafs 104, and other dimensions in Network Environment 100 and/or objects in MIM 200, to provide a network operator or user visibility into the utilization of this scarce resource. This can greatly help for planning and other optimization purposes.

Endpoint Checks:

Assurance Appliance 200 can validate that the fabric (e.g. fabric 120) has no inconsistencies in the Endpoint information registered (e.g., two leafs announcing the same endpoint, duplicate subnets, etc.), among other such checks.

Tenant Routing/Forwarding Checks:

Assurance Appliance 200 can validate that BDs, VRFs, subnets (both internal and external), VLANs, contracts, filters, applications, EPGs, etc., are correctly programmed.

Infrastructure Routing:

Assurance Appliance 200 can validate that infrastructure routing (e.g., IS-IS protocol) has no convergence issues leading to black holes, loops, flaps, and other problems.

MP-BGP Route Reflection Checks:

The network fabric (e.g., Fabric 120) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Logical Lint and Real-Time Change Analysis:

Assurance Appliance 200 can validate rules in the specification of the network (e.g., L_Model 270A) are complete and do not have inconsistencies or other problems. MOs in the MIM 200 can be checked by Assurance Appliance 200 through syntactic and semantic checks performed on L_Model 270A and/or the associated configurations of the MOs in MIM 200. Assurance Appliance 200 can also verify that unnecessary, stale, unused or redundant configurations, such as contracts, are removed.

Figure 2B:
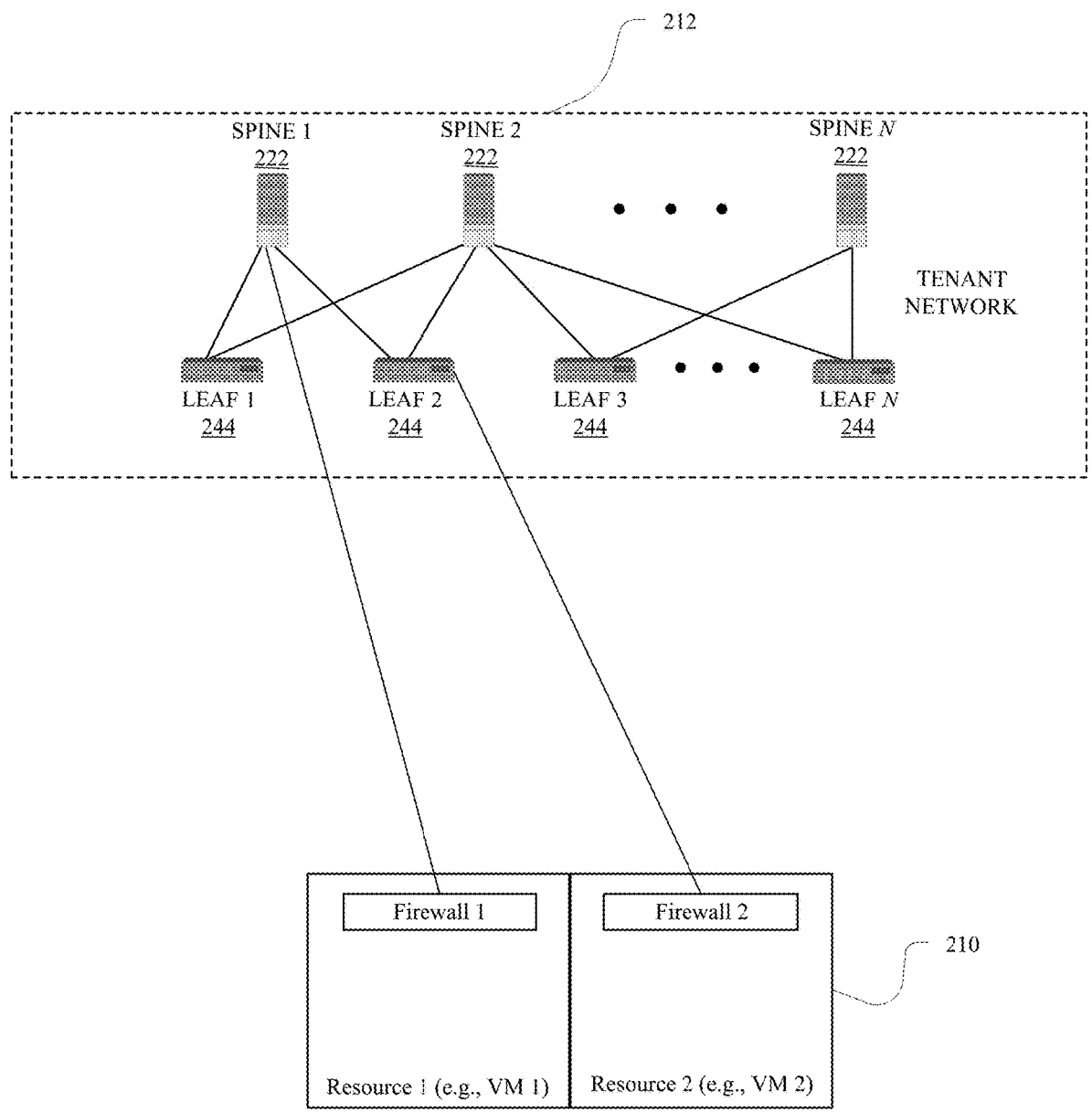
FIG. 2B illustrates an example of a connection between an assurance appliance and devices in a tenant network according to some aspects of the technology.

FIG. 2B conceptually illustrates an example of a connection between an assurance appliance and devices in a tenant network. As illustrated in FIG. 2B, tenant network 212 includes various spine switches 222, which are coupled to leaf switches 244. For simplicity of illustration, host devices are not illustrated; however, one of skill in the art would understand that a greater (or fewer) number of spine switches 222, leaf switches 244, and/or host devices may be present in tenant network 212, without departing from the scope of the technology. Additionally tenant network 212 may include virtually any other virtual and/or physical devices without departing from the technology.

Appliance 210 includes multiple virtual machines (VMs), e.g., Resource 1 (VM1), and Resource 2 (VM2), each of which include a firewall, e.g., Firewall 1, and Firewall 2, respectively. It is understood that appliance 210 can include any number of physical/virtual devices, such as, containers and/or virtual machines, without departing from the technology.

In the example of FIG. 2B, appliance 210 is coupled to tenant network 212 via VM1 and VM2. Specifically, VM1 is coupled to Spine 1 222, and VM 2 is coupled to Leaf 2 244. Connections between VM1 and Spine 1 222 are mediated by Firewall 1; connections between VM 2 and Leaf 2 244 are mediated by Firewall 2.

In practice, packets transacted between VM 1 and Spine 1 222 can be controlled by Firewall 1, and packets transacted between VM 2 and Leaf 2 244, controlled by VM 2. In this manner, failures of Spine 1 222 and Leaf 2 244 can be simulated by blocking services and traffic at Firewall 1, and Firewall 2, respectively. As discussed above, blocking traffic at appliance 210 can be used to simulate failure events e.g., in Spine 1 222 and Leaf 2 244, without killing those devices. As such, appliance 210 can be used to simulate failure events in a tenant network (such as example tenant network 212) without disrupting devices or active services in the network fabric.

Figure 3:
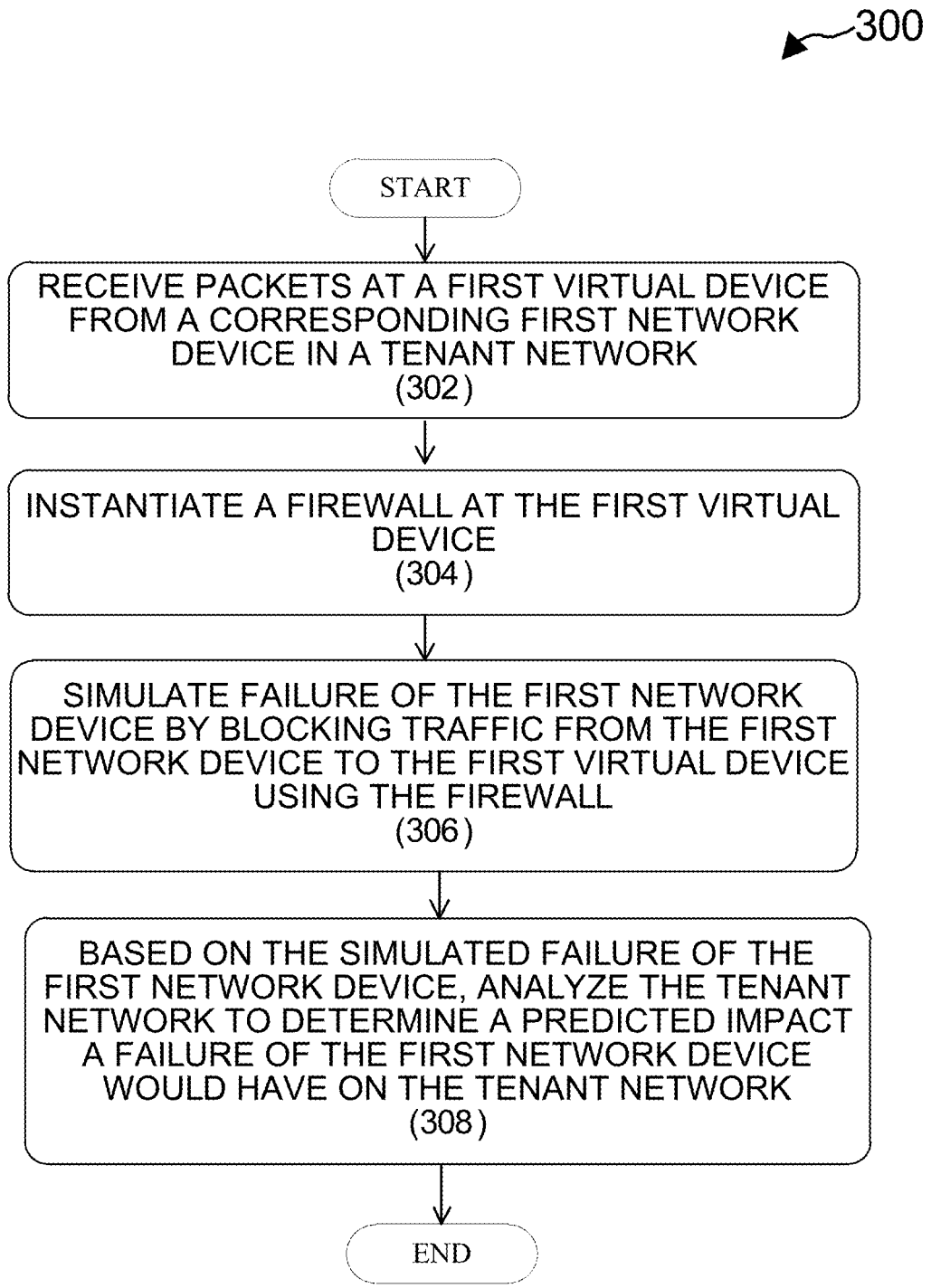
FIG. 3 illustrates steps of an example process for simulating network error events at a tenant network, according to some aspects of the technology.

FIG. 3 illustrates steps of an example process 300 for simulating network error events at a tenant network. Process 300 begins with step 302 in which packets are received at a first virtual device in a network monitoring appliance that corresponds with a first network device in a tenant network. Similar to the example provided above with respect to FIG. 2B, the first virtual device of the network monitoring appliance can be a virtual machine, a network container, or the like. Similarly, the first network device in the tenant network may be a routing device, such as they spine switch, or a leaf switch, etc.

It is understood that the first virtual device and first network device may include any networking devices or appliances, without departing from the scope of the technology.

In step 304, a firewall is instantiated at the first virtual device. In some aspects, instantiation of the firewall may occur the same virtual environment of the first virtual device, i.e., within same VM or container. In other aspects, instantiation of the firewall may include instantiation of a new VM or container within the monitoring appliance, and that provides firewall filtering for traffic between the first virtual device and the corresponding first network device in the tenant network.

In step 306, a failure of the first network device is simulated by blocking traffic from the first network device to the first virtual device using the firewall. In some aspects, the firewall may be configured to block traffic associated with a specific function or service in order to simulate interruptions for that functionality in the corresponding first network device. In other aspects, while traffic from the first network device in the tenant network may be blocked, for example, to simulate the total failure with the first network device.

In step 308, and analysis of the tenant network is performed to determine a predicted impact that a failure of the first network device would have on the tenant network. As discussed above, a monitoring appliance (e.g., Appliance 200) can therefore be used to simulate network failure events for the purpose of "stress testing" certain failure scenarios. Such simulations can be performed without the need to suspend tenant services and/or device operation, which could disrupt concurrently connected clients and/or users.

Figure 4:
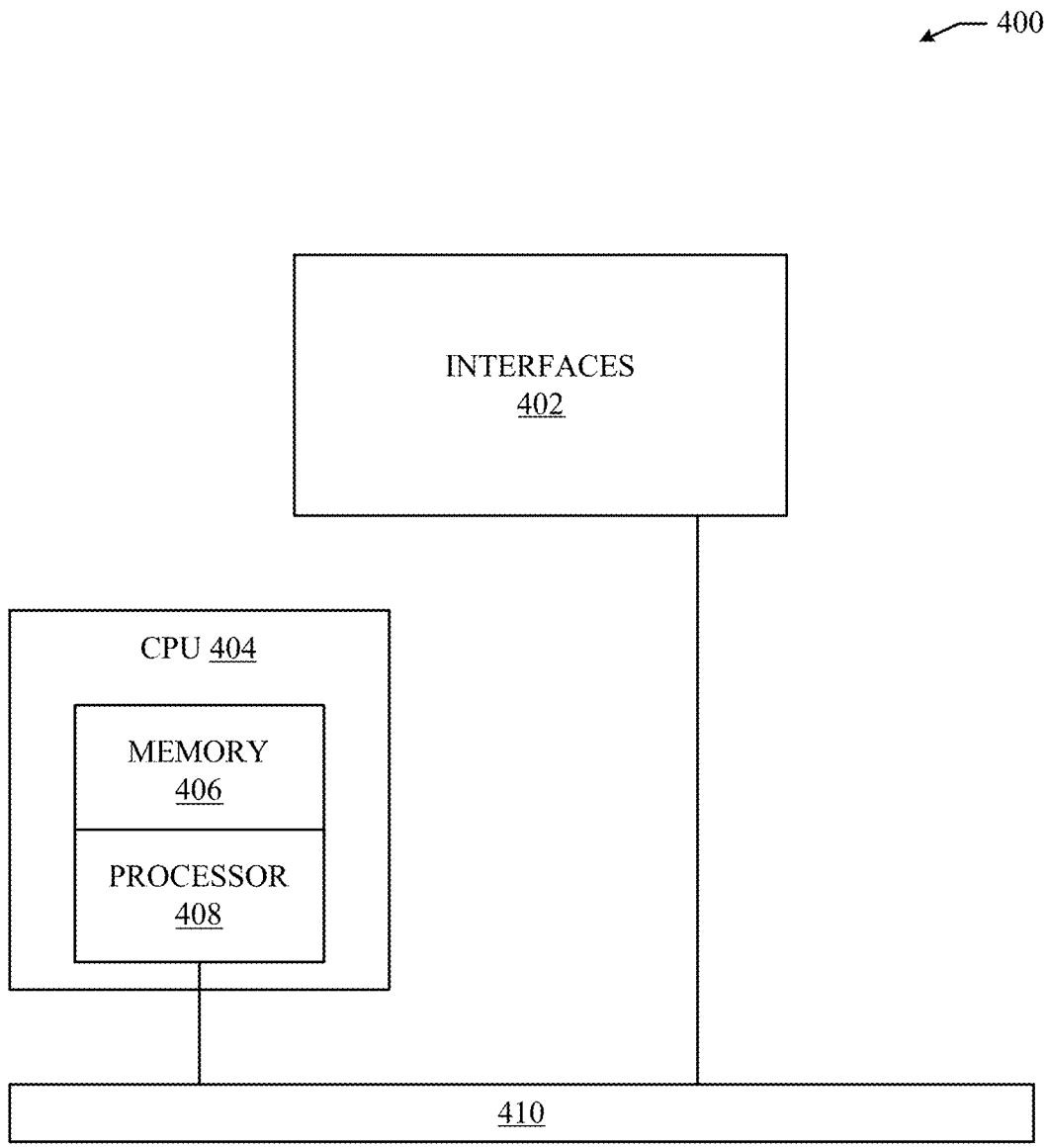
FIG. 4 illustrates an example network device in accordance with various embodiments.

FIG. 4 illustrates an example network device 400 suitable for implementing a network appliance of the subject technology. Network device 400 includes a central processing unit (CPU) 404, interfaces 402, and a bus 410 (e.g., a PCI bus). When acting under the control of appropriate software or firmware, the CPU 404 is responsible for executing packet management, error detection, and/or routing functions. CPU 404 accomplishes all these functions under the control of software including an operating system and any appropriate applications software. CPU 404 may include one or more processors 408, such as a processor from the INTEL X86 family of microprocessors. In some cases, processor 408 can be specially designed hardware for controlling the operations of network device 400. In some cases, a memory 406 (e.g., non-volatile RAM, ROM, etc.) also forms part of CPU 404. However, there are many different ways in which memory could be coupled to the system.

The interfaces 402 are typically provided as modular interface cards (sometimes referred to as "line cards"). They can control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 404 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 406 could also hold various software containers and virtualized execution environments and data.

In some implementations, the program instructions may be configured to cause CPU 404 and/or processor 408 to perform operations for simulating failure events in a tenant network. In particular, the program instructions can cause CUP 404 and/or processor 408 to perform operations for connecting each of a plurality of virtual devices in a monitoring appliance to a respective network device in a tenant network, receiving one or more packets, at a first virtual device in the monitoring appliance, from a corresponding first network device in the tenant network, instantiating a firewall at the first virtual device, wherein the firewall is configured to selectively block traffic routed from the first network device to the first virtual device in the monitoring appliance, simulating failure of the first network device by blocking traffic from the first network device to the first virtual device using the firewall at the first virtual device, and based on the simulated failure of the first network device, analyzing the tenant network to determine a predicted impact a failure of the first network device would have on the tenant network.

In some implementations, the processors are further configured to perform operations including receiving one or more packets, at a second virtual device in the monitoring appliance, from a corresponding second network device in the tenant network, instantiating a firewall at the first virtual device, wherein the firewall is configured to selectively block traffic routed from the second network device to the second virtual device in the monitoring appliance, simulating failure of the second network device by blocking traffic from the second network device to the second virtual device using the firewall at the second device, and based on the simulated failure of the second network device, analyzing the tenant network to determine a predicted impact a failure of the second network device would have on the tenant network.

In some aspects, the first virtual device in the monitoring appliance is a virtual machine (VM). In other aspects, the first virtual device in the monitoring appliance is a network container.

Network device 400 can also include an application-specific integrated circuit (ASIC), which can be configured to perform routing and/or switching operations. The ASIC can communicate with other components in the network device 400 via the bus 410, to exchange data and signals and coordinate various types of operations by the network device 400, such as routing, switching, and/or data storage operations, for example.

Figure 5:
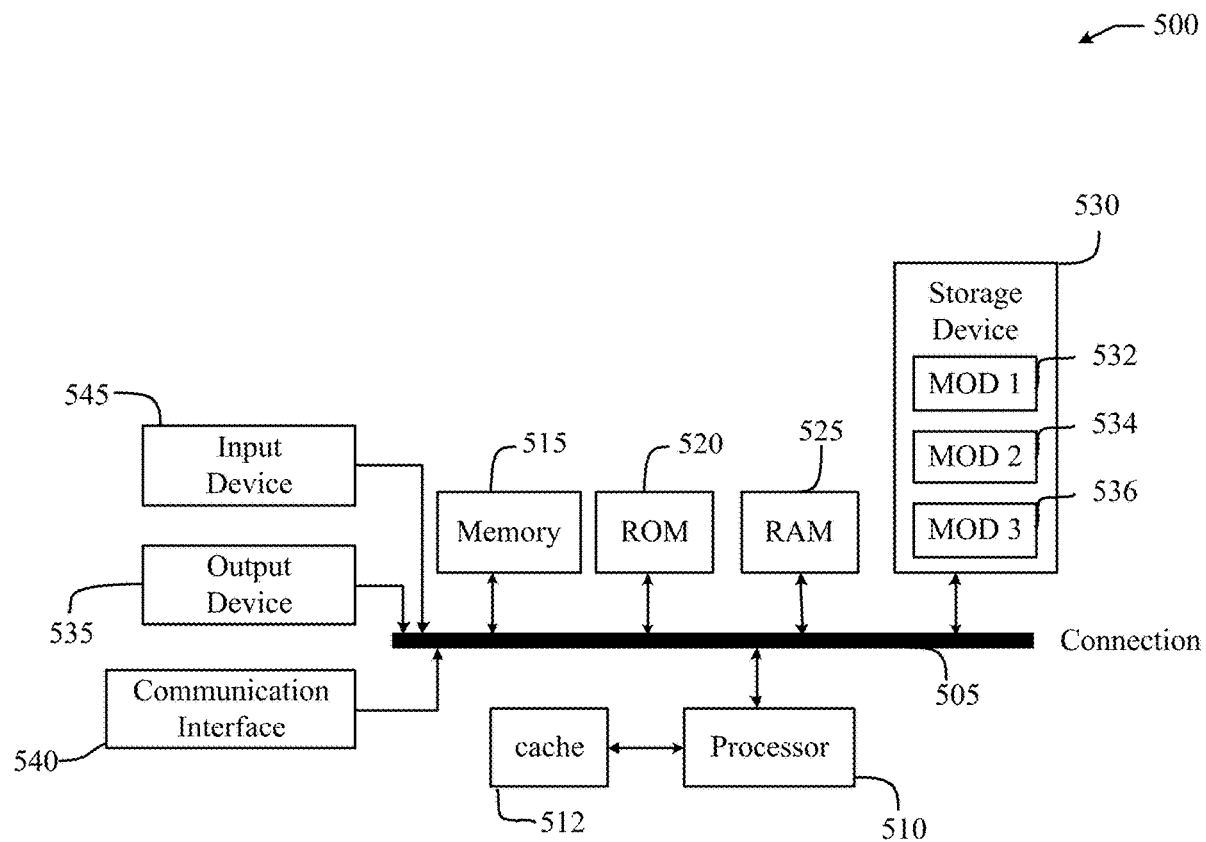
FIG. 5 illustrates an example computing device in accordance with various embodiments.

FIG. 5 illustrates a computing architecture 500 wherein the components of the system are in electrical communication with each other via connection 505, such as a bus. System 500 includes a processing unit (CPU or processor) 510 and a system connection 505 that couples various system components including system memory 515, such as read only memory (ROM) 520 and random access memory (RAM) 525, to processor 510. System 500 can include a cache of high-speed memory connected directly with, in close proximity to, or integrated as part of the processor 510. The system 500 can copy data from the memory 515 and/or the storage device 530 to the cache 512 for quick access by processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. Storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions.

Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for simulating network failure events at a monitoring appliance, comprising:
   receiving one or more packets, at a first virtual device in a monitoring appliance, from a corresponding first network device in a tenant network, the first network device being upstream from the first virtual device;
   instantiating a firewall at the first virtual device, wherein the firewall is configured to selectively block traffic routed from the first network device to the first virtual device in the monitoring appliance by blocking specific ports/services to simulate the interruption of device or service availability;
   simulating failure of the first network device by blocking traffic from the first network device to the first virtual device using the firewall at the first virtual device; and
   based on the simulated failure of the first network device, analyzing the tenant network to determine a predicted impact a failure of the first network device would have on the tenant network.

2. The computer-implemented method of claim 1, further comprising:
   receiving one or more packets, at a second virtual device in the monitoring appliance, from a corresponding second network device in the tenant network;
   instantiating a firewall at the first virtual device, wherein the firewall is configured to selectively block traffic routed from the second network device to the second virtual device in the monitoring appliance;
   simulating failure of the second network device by blocking traffic from the second network device to the second virtual device using the firewall at the second device; and
   based on the simulated failure of the second network device, analyzing the tenant network to determine a predicted impact a failure of the second network device would have on the tenant network.

3. The computer-implemented method of claim 1, wherein the first virtual device in the monitoring appliance is a virtual machine (VM).

4. The computer-implemented method of claim 1, wherein the first virtual device in the monitoring appliance is a network container.

5. The computer-implemented method of claim 1, wherein the first network device in the tenant network is a spine switch.

6. The computer-implemented method of claim 1, wherein the first network device in the tenant network is a leaf switch.

7. The computer-implemented method of claim 1, wherein the monitoring appliance comprises a series of virtual machines (VMs) operating in a cluster mode.

8. A system for analyzing a network fabric the system comprising:
   one or more processors;
   a network interface coupled to the processors; and
   a non-transitory computer-readable medium coupled to the processors, the computer-readable medium comprising instructions stored therein, which when executed by the processors, cause the processors to perform operations comprising:
   connecting each of a plurality of virtual devices in a monitoring appliance to a respective network device in a tenant network;
   receiving one or more packets, at a first virtual device in the monitoring appliance, from a corresponding first network device in the tenant network, the first network device being upstream from the first virtual device by blocking specific ports/services to simulate the interruption of device or service availability;
   instantiating a firewall at the first virtual device, wherein the firewall is configured to selectively block traffic routed from the first network device to the first virtual device in the monitoring appliance;
   simulating failure of the first network device by blocking traffic from the first network device to the first virtual device using the firewall at the first virtual device; and
   based on the simulated failure of the first network device, analyzing the tenant network to determine a predicted impact a failure of the first network device would have on the tenant network.

9. The system of claim 8, wherein the processors are further configured to perform operations comprising:
   receiving one or more packets, at a second virtual device in the monitoring appliance, from a corresponding second network device in the tenant network;
   instantiating a firewall at the first virtual device, wherein the firewall is configured to selectively block traffic routed from the second network device to the second virtual device in the monitoring appliance;

simulating failure of the second network device by blocking traffic from the second network device to the second virtual device using the firewall at the second device; and based on the simulated failure of the second network device, analyzing the tenant network to determine a predicted impact a failure of the second network device would have on the tenant network.

10. The system of claim 8, wherein the first virtual device in the monitoring appliance is a virtual machine (VM).

11. The system of claim 8, wherein the first virtual device in the monitoring appliance is a network container.

12. The system of claim 8, wherein the first network device in the tenant network is a spine switch.

13. The system of claim 8, wherein the first network device in the tenant network is a leaf switch.

14. The system of claim 8, wherein the monitoring appliance comprises a series of virtual machines (VMs) operating in a cluster mode.

15. A non-transitory computer-readable storage medium comprising instructions stored therein, which when executed by one or more processors, cause the processors to perform operations comprising:

connecting each of a plurality of virtual devices in a monitoring appliance to a respective network device in a tenant network;

receiving one or more packets, at a first virtual device in the monitoring appliance, from a corresponding first network device in the tenant network, the first network device being upstream from the first virtual device by blocking specific ports/services to simulate the interruption of device or service availability;

instantiating a firewall at the first virtual device, wherein the firewall is configured to selectively block traffic routed from the first network device to the first virtual device in the monitoring appliance;

simulating failure of the first network device by blocking traffic from the first network device to the first virtual device using the firewall at the first virtual device; and based on the simulated failure of the first network device, analyzing the tenant network to determine a predicted impact a failure of the first network device would have on the tenant network.

16. The non-transitory computer-readable storage medium of claim 15, wherein the processors are further configured to perform operations comprising:

receiving one or more packets, at a second virtual device in the monitoring appliance, from a corresponding second network device in the tenant network;

instantiating a firewall at the first virtual device, wherein the firewall is configured to selectively block traffic routed from the second network device to the second virtual device in the monitoring appliance;

simulating failure of the second network device by blocking traffic from the second network device to the second virtual device using the firewall at the second device; and based on the simulated failure of the second network device, analyzing the tenant network to determine a predicted impact a failure of the second network device would have on the tenant network.

17. The non-transitory computer-readable storage medium of claim 15, wherein the first virtual device in the monitoring appliance is a virtual machine (VM).

18. The non-transitory computer-readable storage medium of claim 15, wherein the first virtual device in the monitoring appliance is a network container.

19. The non-transitory computer-readable storage medium of claim 15, wherein the first network device in the tenant network is a spine switch.

20. The non-transitory computer-readable storage medium of claim 15, wherein the first network device in the tenant network is a leaf switch.

* * * * *